(12) United States Patent
Mizunuma et al.

(10) Patent No.: US 6,493,054 B2
(45) Date of Patent: Dec. 10, 2002

(54) LIQUID CRYSTAL DISPLAY

(75) Inventors: Masaya Mizunuma, Kikuchi-gun (JP); Akira Tamatani, Kikuchi-gun (JP); Ken Nakashima, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 09/825,953

(22) Filed: Apr. 5, 2001

(65) Prior Publication Data

US 2001/0038430 A1 Nov. 8, 2001

(30) Foreign Application Priority Data

Apr. 6, 2000 (JP) .......................................... 2000-105311

(51) Int. Cl.[7] ............................................ G02F 1/1335
(52) U.S. Cl. ......................................................... 349/123
(58) Field of Search ................................ 349/141, 128, 349/130, 123

(56) References Cited

U.S. PATENT DOCUMENTS 5,893,625 A 4/1999 Tamatani et al.
5,959,712 A 9/1999 Morii et al.
6,285,428 B1 * 9/2001 Kim et al. .................. 349/141

* cited by examiner

*Primary Examiner*—James Dudek
(74) *Attorney, Agent, or Firm*—Oblon, Spivak, McClelland, Maier & Neustadt, P.C.

(57) ABSTRACT

A liquid crystal display of the present invention includes: a pair of substrates, at least one of which is transparent; a liquid crystal layer being interposed between said pair of substrates; electrodes for applying an electric field to liquid crystals molecules in said liquid crystal layer; active switching elements connected with said electrodes; an alignment film being formed on a surface of at least one of said pair of substrates, said surface being contacted with said liquid crystal layer; and an optical device for controlling a transmission of light in cooperation with alignment of said liquid crystal molecules in each pixel, said means being located on at least one said pair of substrates; wherein an aligning direction of each liquid crystal molecule in each pixel is ranged between −2 degrees to +2 degrees with respect to an average aligning direction $\theta_{1c}$ of said liquid crystal layer.

8 Claims, 11 Drawing Sheets

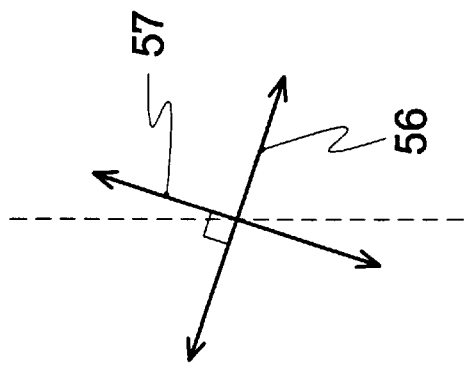
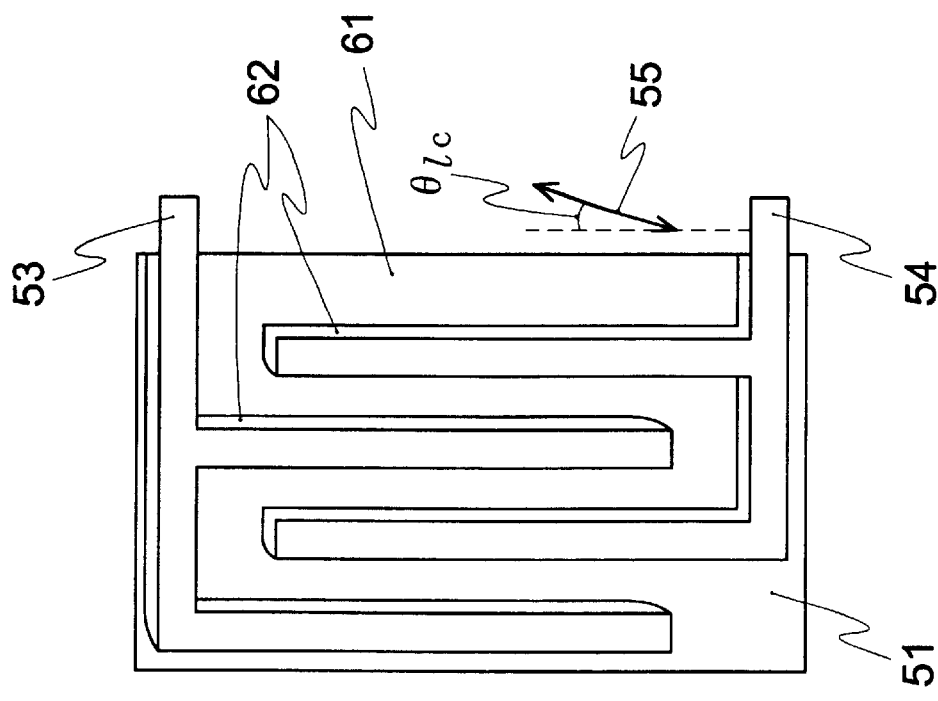
FIG. 10(a)
FIG. 10(b)

NO VOLTAGE APPLIED

VOLTAGE APPLIED

LIQUID CRYSTAL DISPLAY

BACKGROUND OF THE INVENTION

The present invention relates to a liquid crystal display. More particularly, the present invention provides an In-plane switching (IPS) type liquid crystal display, in which an electric field is formed laterally to its substrates and applied to a liquid crystal layer, having a wide viewing angle, a high contrast ratio and an excellent display quality.

In a liquid crystal display interposing a liquid crystal layer between a pair of substrates, at least one of them being transparent, some display mode have been used as a display method. Examples of the display mode which have widely been used include a twisted nematic (TN) mode. According to this mode, an electric field is applied to a liquid crystal layer to control its rotary polarization, thereby controlling a transparency of the liquid crystal layer and obtaining display of image.

On the other hand, there has been an in-plane switching (IPS) mode for applying, to a liquid crystal, an electric field which is almost parallel with a substrate by using interdigital shaped electrodes (hereinafter referred to as an interdigital electrode) or the like. According to this mode, an electric field is applied to the liquid crystal to control birefringence of the liquid crystal, thereby switching display of images. Japanese Patent No. 2743293 has disclosed that the IPS mode has a greater angle of view characteristic than that in a conventional TN mode.

FIG. 9 is an explanatory view showing a part of a conventional liquid crystal display using an IPS mode which is formed by a liquid crystal having a positive dielectric anisotropy. FIG. 9 shows an electrode substrate 51, two kinds of interdigital pixel electrodes 53 and 54 formed on the electrode substrate 51, a counter substrate 52, and liquid crystal molecules included in a liquid crystal layer 60 which constitute a liquid crystal panel in the liquid crystal display. As shown in FIG. 9, the electrode substrate 51 having the interdigital pixel electrodes 53, 54 and the counter substrate 52 are provided in parallel with each other and the liquid crystal layer 60 including the liquid crystal molecules is present between the electrode substrate 51 and the counter substrate 52. As shown in FIG. 10(a), the electrode substrate 51 and the counter substrate 52 are subjected to an alignment treatment in a direction of angle 55, thereby the liquid crystal molecules of the liquid crystal layer 60 are provided to have an angle of $\theta_{1c}$ with respect to a length-wise direction of pixel electrode 53 and 54.

Next, a display principle of the liquid crystal display will be described with reference to FIG. 11. FIG. 11 is a partial view showing the liquid crystal display using the IPS mode. FIG. 11 shows only the liquid crystal panel and two polarizing plates in the liquid crystal display. Referring to the liquid crystal panel, particularly, there are shown the electrode substrate 51, interdigital pixel electrodes 53 and 54 (only one pixel electrode is shown respectively), the counter substrate 52 and liquid crystal molecules included in the liquid crystal layer 60 (only seven molecules are shown). In FIG. 11, the reference numeral 53 denotes a first pixel electrode, the reference numeral 54 denotes a second pixel electrode, the reference numeral 51 denotes an electrode substrate, the reference numeral 52 denotes an counter substrate, the reference numeral 59 denotes a first polarizing plate and the reference numeral 58 denotes a second polarizing plate. As shown in FIG. 11, the first polarizing plate 59 is provided such that a direction of a major axis of the liquid crystal molecule is parallel with a direction of a transmission axis of the first polarizing plate 59 (show in a double headed arrow) and a direction of a transmission axis of the second polarizing plate 58 (also shown in a double headed arrow) is orthogonal to that of the first polarizing plate 59. Directions of aligning treatments of alignment films (not shown) formed on the electrode substrate 51 and the counter substrate 52 are both parallel with the transmission axis of the first polarizing plate 59 or the second polarizing plate 58.

In a state in which no voltage is applied (that is, an electric field is not formed between the first pixel electrode 53 and the second pixel electrode 54 as shown in FIG. 11A), a linearly polarized light incident on the liquid crystal layer 60 has an oscillation direction parallel with the liquid crystal molecule and does not receive a birefringence effect during passage through the liquid crystal layer. Therefore, a direction P of oscillation of the light passing through the counter substrate 52 is orthogonal to the transmission axis of the second polarizing plate 58 and the light transmitted through the counter substrate 52 cannot be transmitted through the second polarizing plate 58 and is set in a dark state.

In a state in which voltage is applied (that is, the electric field is formed between the first pixel electrode 53 and the second pixel electrode 54) as shown in FIG. 11B, the liquid crystal molecule is rotated in the direction of the electric field (the degree of the rotation depends on a magnitude of the electric field) while maintaining a parallel orientation with respect to the surfaces of the electrode substrate 51 and the counter substrate 52. For this reason, the linearly polarized light incident on the liquid crystal layer 60 receives the birefringence effect to be changed into an elliptically polarized light Q and a certain quantity of the light passes through the second polarizing plate. The quantity of the light transmitted through the second polarizing plate is changed depending on a rotating angle θ of the liquid crystal molecule. The rotating angle θ of the liquid crystal is a function of an applied voltage (V). Thus, display of image can be carried out by changing voltages to be applied to the first pixel electrodes 53 and the second pixel electrodes 54.

At this time, an intensity of the transmitted light is expressed in the Equation 1:

$$I=I_o \cdot \sin^2(\pi R/\pi) \cdot \sin^2(2\theta) \qquad \text{(Equation 1)}$$

Wherein $I_o$ represents an intensity of the light incident on the first polarizing plate 59, λ represents a wavelength of the light, and R represents a retardation which is represented by an optical path difference $(\Delta n) \cdot d$ between an ordinary light and an extraordinary light, Δn representing an absolute value $(|n_e - n_o|)$ of a difference between a refractive index $n_o$ of the ordinary light and a refractive index $n_e$ of the extraordinary light in the liquid crystal. As is apparent from the Equation 1, the transmitted light has a maximum intensity with $\theta = \pi/4$.

FIG. 12 shows a change in a quantity of the transmitted light with a variation in a voltage to be applied between the first pixel electrode 53 and the second pixel electrode 54. When the applied voltage is increased, the rotating angle of the liquid crystal molecule becomes greater and the quantity of the transmitted light is increased. θ in the Equation 1 corresponds to the average aligning direction of the liquid crystal layer realigned by an electric field formed laterally to the substrate.

Usually, the TN mode is used in a normally white mode in which white display is carried out without the application of an electric field and black display is carried out with the electric field applied. At this time, more black display can be obtained by the application of a higher electric field to the liquid crystal. As a result, a high contrast ratio can be achieved.

On the other hand, the IPS mode is used in a normally black mode in which the black display is carried out without the application of the electric field and the white display is carried out with the electric field applied. FIGS. 9 and 10 show sectional and plan views showing a conventional IPS mode, respectively. In a liquid crystal display using an IPS mode, θ=0 is theoretically obtained in the Equation 1 without the application of the electric field so that light is not transmitted. However, the pixel electrodes 53 and 54 actually have certain thickness. Therefore, when an aligning treatment such as rubbing is performed, a region 62 having an aligning direction shifted from the angle 55 of the aligning treatment as well as a region 61 having an aligning direction almost coincident with the angle 55 of aligning treatment is formed.

By the region 62 having the aligning direction shifted, transmission of light is caused in spite of the black display. This is a serious problem when a high contrast ratio is to be implemented by using the IPS mode as a practical liquid crystal display. Moreover, in the case in which this region is generated in a rubbing direction, it is visible as a stripe-shaped mura having a varied brightens. Therefore, there is a problem in respect of display quality.

In particular, in the IPS mode liquid crystal display equipped with active switching elements such as TFTs (thin film transistors), on the substrate there are electrodes for applying the lateral electric field to the liquid crystal, active switching elements for selectively applying voltages to the electrodes, and signal wirings for applying electric signals to the switching element as well as the electrodes. That is, surface irregularities of several hundreds to several thousands nm (nanometer) caused by the electrodes, switching elements and wirings are formed on the substrate. Furthermore, in which a color filter is formed on the counter substrate in order to carry out color display, colorants contained in the filter, seams formed between pixels, a black matrix, and the like cause surface irregularities on the counter substrate. These irregularities on the substrates make an uniform alignment of the liquid crystal to be disturbed, and therefore problematic.

Japanese Unexamined Patent Publication No. 333151/1998 has disclosed a method preventing the generation of said stripe-shaped mura caused by deflected distribution of rubbing cloth staples. In this method, projections to fix the deflected distribution of rubbing cloth staples are formed on the periphery of the substrate. However, the detailed conditions of rubbing process are not described.

Furthermore, it is also possible to form or widen a black matrix on the counter substrate in order to block the light passing through the region in which aligning direction of liquid crystal is shifted. With the black matrix, undesired leakage of light is prevented, so that high contrast ratio is obtained. However, an aperture ratio of the substrate (i.e. that of liquid crystal panel) is decreased with the black matrix, thereby a luminance of white image is reduced.

Moreover, a contrast ratio is greatly affected by a relationship between the aligning direction of the liquid crystal on two interfaces where the liquid crystal and each substrate come in contact with each other and an absorption axis of a polarizing plate provided on the outside of each substrate.

In order to solve the above-mentioned problems, the present invention has been made.

SUMMARY OF THE INVENTION

As shown in FIG. 1, a liquid crystal display according to the present invention comprises a pair of substrates 1, 2 and a liquid crystal layer 5 between the substrates. One of said substrates is provided with pixel electrodes 3, opposed electrodes 4 and active switching elements (not shown) to apply electric fields, which are substantially parallel to the substrate, to liquid crystal molecules included in the liquid crystal layer 5. Further, the liquid crystal display of the present invention comprises optical devices (e.g. polarizing plates) 7, 8 to selectively pass the light. Furthermore, either or both of the substrates 1, 2 are provided with alignment films 6a, 6b on their surface facing the liquid crystal layer, thereby aligning directions of liquid crystal molecules in each pixel are set to be in a range of ±2 degree with respect to an average aligning direction $\theta_{1c}$ of the liquid crystal layer 5 without applying electric fields.

The liquid crystal layer 5 designates liquid crystal molecules interposed between the substrates 1, 2. Moreover, the average aligning direction $\theta_{1c}$ of the liquid crystal layer, which is shown in FIG. 8 diagrammatically, is computed with following equation 2.

$$\theta_{1c}=\Sigma(\theta_i \times S_i)/S (i=1, 2, 3 \ldots) \quad \text{(Equation 2)}$$

In the equation, $\theta_i$ designates an aligning direction of liquid crystal, Si designates an area of regions having the aligning direction of $\theta_i$, and S designates an area of effective display region through which the light transpire to display images. It should be noted that separators, such as polymer beads, for maintaining prescribed distance between two substrates may be dispersed into the liquid crystal layer, regions around the separators in which aligning directions are varied are excluded from the area S.

That is, the average aligning direction $\theta_{1c}$ of the liquid crystal layer is computed with following steps. Firstly, the effective display region is divided into the regions according to their aligning direction $\theta_1, \theta_2, \theta_3, \ldots$. Then, the area $S_1, S_2, S_3, \ldots$ of each region is multiplied by its aligning direction $\theta_1, \theta_2, \theta_3$, respectively, and products $\theta_1 \times S_1, \theta_2 \times S_2, \theta_3 \times S_3, \ldots$ are summed up. Lastly, the sum of the products is divided by the area S of the effective display region, therefore the average aligning direction $\theta_{1c}$ is obtained.

Here, an aligning direction $\theta_i$ of liquid crystal in each region is defined and measured as follows. A pair of substrates sandwiching a liquid crystal layer is interposed between two polarizing plates having their absorption axes orthogonal to each other (i.e. cross nicole arrangement). When the liquid crystal layer with the substrates is rotated in relative to the polarizing plates, the intensity of light passing through the liquid crystal layer and the polarizing plates varies. Therefore, an angle between the absorption axis of one polarizing plate and length-wise direction of pixel electrodes on the substrate wherein the intensity of light passing through the region becomes minimized is assumed as aligning direction $\theta_i$ of liquid crystal in this region.

With referring to FIGS. 7(a) to 7(c), an aligning direction of liquid crystal in one region is explained. In an example shown in FIG. 7(a), a liquid crystal molecule on the electrode substrate and a liquid crystal molecule on the counter substrate as well as the other liquid crystal molecules have almost same aligning direction, i.e. $\theta_{1c}$. On the other hand, in an example shown in FIG. 7(b), an aligning direction of a liquid crystal molecule on the electrode substrate is not equal to that of a liquid crystal molecule on the counter substrate, however an average aligning direction in this region is $\theta_{1c}$. FIG. 7(c) shows an alignment of the liquid crystal in which each liquid crystal molecule is realigned under application of electric field by the pixel electrodes, wherein $\theta_{1c}$ corresponds to an angle at which a quantity of transmitted light, i.e. light passing through the liquid crystal and the polarizing plates sandwiching the liquid crystal and having their axes orthogonal to each other, is minimized.

Moreover, it is preferable that the alignment film formed of an organic substance should be used for controlling the orientation of the liquid crystal. In order to relieve the irregularities on a surface of the substrate, particularly of a substrate on which active switching elements are formed, so as to obtain an uniform aligning direction, it is effective to flatten the irregularities of the substrate by means of an insulating materials. To form an aligning film thickly is also effective to relieve the irregularities. Furthermore, a flattened layer may be provided on the surface of the substrate and an aligning film may be formed on the flattened layer.

The alignment treatment of the liquid crystal is carried out by a rubbing method, and it is preferable that a rubbing strength L shown in Equation 3 should be 50 mm or more.

$$L = N \times l_d (1 + 2\pi r n/(60V)) \quad \text{(Equation 3)}$$

wherein N represents the number of times of rubbing [number], $l_d$ represents an amount of deformation of rubbing cloth [mm], r represents a radius of a rubbing roller [mm], n represents the number of revolution of the roller per minutes [rpm] and V represents a stage moving speed [mm/s].

With reference to FIG. 6, a rubbing process for aligning the liquid crystal will be described. As shown in FIG. 6, a roller 72 on which a velvet-like rubbing cloth 73 made of rayon or cotton and having a small staple length is wound is rotated at n times/min. in a direction of an arrow R. At the same time, a substrate 74 having an alignment film formed is mounted on a stage 71 and is moved at a constant speed V in a direction of an arrow S. The rubbing cloth 73 on the roller 72 is pushed against the substrate 74 on the stage 71 and deformed, therefore the deformation of the rubbing cloth is assumed to an amount of deformation $l_d$. A rubbing direction of the substrate 74 thus rubbed is represented by a composite vector of a speed vector at which the rubbing cloth 73 rubs the substrate 74 and a moving speed vector of the stage 71. In general, the speed at which the rubbing cloth 73 rubs the substrate 74 is much higher than the moving speed of the stage 71. Therefore, the rubbing direction is obtained by projecting the rotating direction of the rubbing roller onto the substrate.

In some cases in which a surface of the substrate is flattened, an effective aligning treatment can be achieved even if the rubbing strength L is set to 50 mm or less. However, since the flattening process causes an increase in the number of manufacturing steps, a decrease in an effective voltage to be applied to a liquid crystal and a rise in cost, it is not preferable. On the other hand, if the rubbing strength L is increased, mura in a displayed image appears easily. Therefore, it is preferable that the rubbing strength L should be 300 mm or less.

Moreover, it is preferable that the aligning direction of the liquid crystal molecule in the interface of one substrate and that of the liquid crystal molecule in the interface of the other substrate should be almost equal to each other. The expression of "almost equal" implies that an angle defined by both aligning directions is 0 to 3 degrees.

In the present invention, moreover, it is preferable that an optical device for selectively passing the light according to the alignment of the liquid crystal molecules should be a pair of polarizing plates provided on the outside of the substrates respectively and absorption axes of the polarizing plates should be almost orthogonal to each other. The expression of "orthogonal" implies that the angle formed by the absorption axes of the polarizing plates ranges from 85 degrees to 95 degrees. More preferably, the angle ranges from 88 degrees to 92 degrees.

Moreover, it is preferable that the relationship between a direction $\theta_{p1}$ of the absorption axis of the polarizing plate closer to an observer and the average aligning direction $\theta_{1c}$ of the liquid crystal should be set to $|\theta_{1c}|-2+\leq|\theta_{p1}|\leq|\theta_{1c}|+3°$ or the relationship between a direction $\theta_{p2}$ of the absorption axis of the polarizing plate which is more distant from the observer and the average aligning direction $\theta_{1c}$ of the liquid crystal should be set to $|\theta_{1c}|-2°\leq|\theta_{p2}|\leq|\theta_{1c}|+3°$. At this time, when the liquid crystal panel is seen from the substrate 1 side, $\theta_{1c}$, $\theta_{p1}$ and $\theta_{p2}$ represent, as a positive direction, a rotation in which the liquid crystal molecule is rotated by applied electric field.

Furthermore, it is preferable that the absorption axis $\theta_{p1}$ of one of the polarizing plates and the average aligning direction $\theta_{1c}(bk)$ of the liquid crystal during black display are almost equal to each other. The expression of "almost equal" implies that an angle formed between the absorption axis and the average aligning direction is 0 to 3 degrees.

It is preferable that the aligning direction of the liquid crystal molecules in each pixel should range within ±2 degrees with respect of the average aligning direction $\theta_{1c}$ of the liquid crystal layer.

BRIEF DESCRIPTION OF THE DRAWINGS

FIGS. 10(a) to 10(b) are an explanatory view showing an alignment of liquid crystal in the conventional IPS mode liquid crystal display;

DETAILED DESCRIPTION

Figure 1:
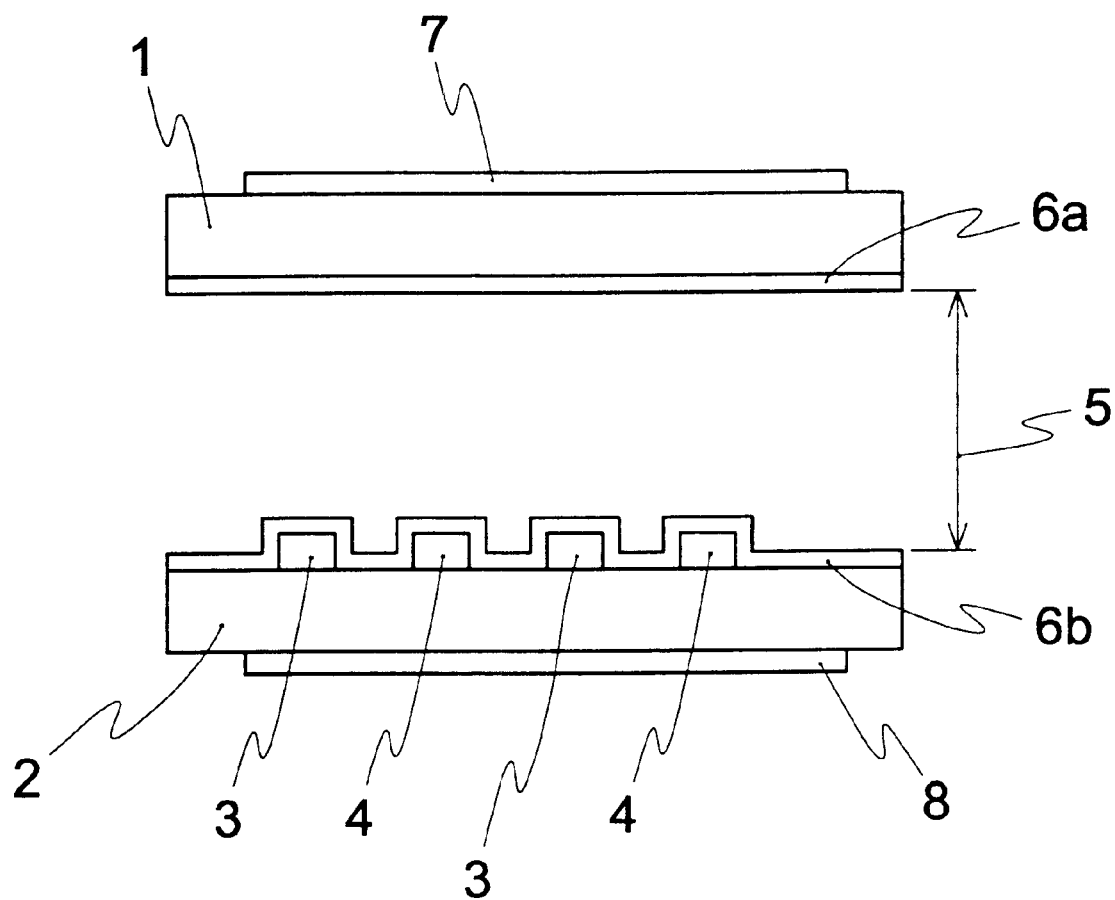
FIG. 1 is an sectional view showing an example of one embodiment of liquid crystal display of the present invention.
Figure 2C:
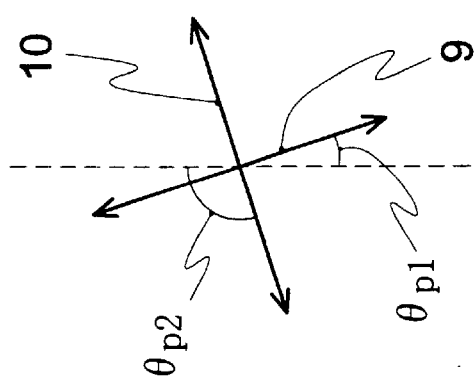
FIGS. 2(a) to 2(c) are explanatory views showing an aligning direction of liquid crystal and directions of absorption axes of polarizing plates.
Figure 2A:
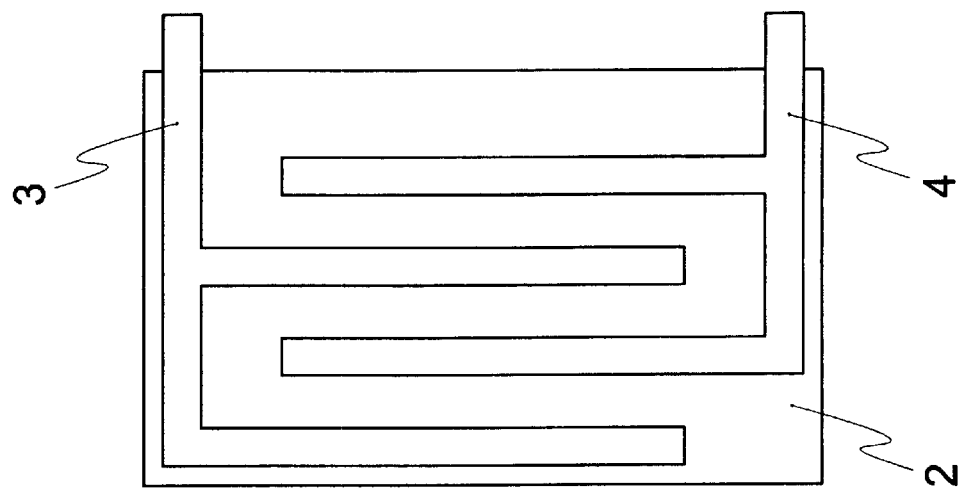
Figure 2B:
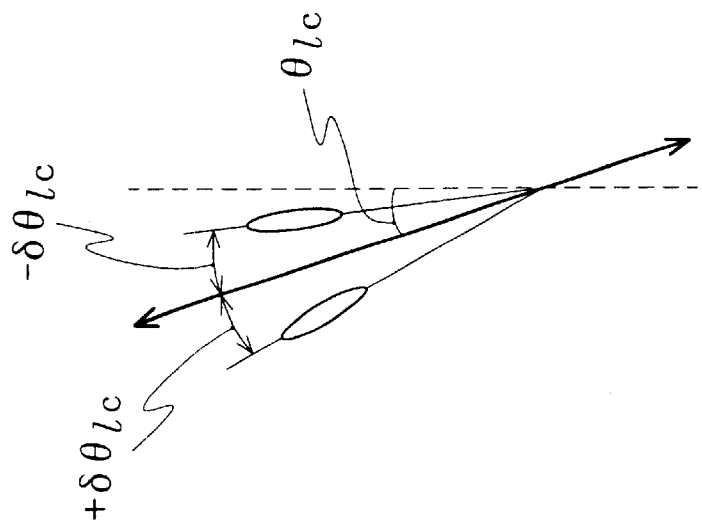
Figure 3A:
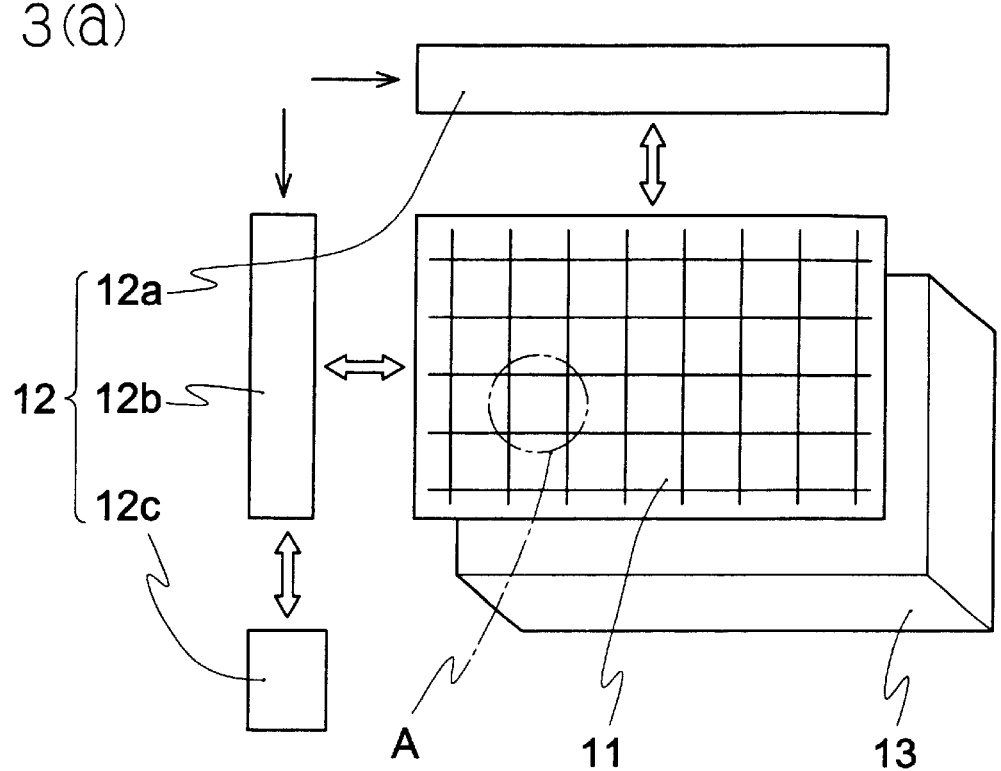
FIGS. 3(a) and 3(b) are schematic views of the liquid crystal display of the present invention.
Figure 3B:
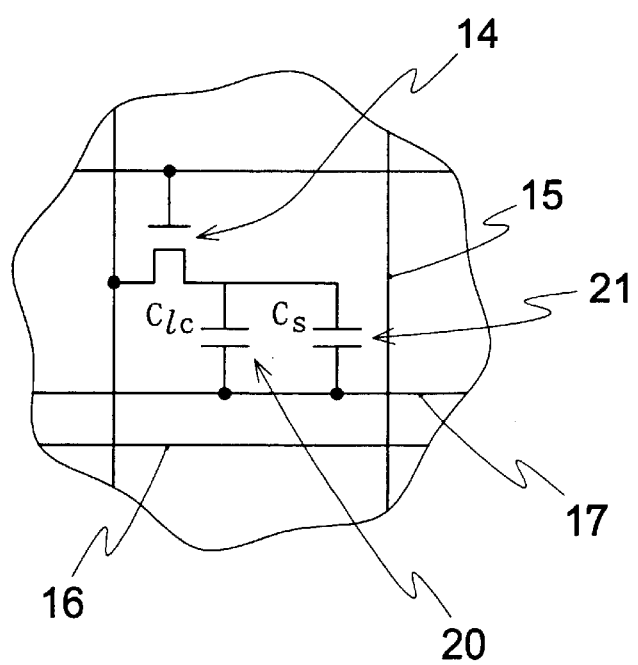

An embodiment of a liquid crystal display according to the present invention will be described below with reference to the drawings. As shown in FIG. 3, the liquid crystal display according to the present invention comprises a liquid crystal display panel 11, a driving circuit 12, and a backlight 13. As shown in FIG. 1, the liquid crystal display panel 11 comprises a electrode substrate 2, a counter substrate 1 and a liquid crystal layer 5 between the substrates. On the electrode substrate 2, pixel electrodes 3, opposed electrodes 4 and active switching elements (not shown) are formed for each pixel. Moreover, to apply electric signals to the opposed electrode and active switching elements, signal wirings are also provided. By applying voltages to pixel electrodes and opposed electrodes, electric fields are formed substantially parallel to the electrode substrate so as to drive and realign liquid crystal molecules in the liquid crystal layer. As shown in FIG. 2, the pixel electrodes 3 and the opposed electrodes 4 have interdigital shapes so that voltages can more effectively be applied to the liquid crystal molecules. As shown in an equivalent circuit of FIG. 3(b) which is an enlarged partial view showing an A portion of FIG. 3(a), each pixel electrode is connected to an active switching element 14 formed on an intersecting point of a source signal line 15 and a gate signal line 16 which are provided like a grid. Moreover, by a driving circuit 12 predetermined voltages are applied to the source signal lines 15, which are connected to the active switching elements 14, and an opposed electrode lines 17. Moreover, the backlight 13 is a light source provided on the back face of the liquid crystal display panel (on the outside of the electrode substrate, for example). The structure of the liquid crystal display described above is common in the following embodiments.

Embodiment 1

FIG. 1 shows one embodiment of the present invention. Two transparent glass substrates having a thickness of 0.7 mm and having their surfaces polished were used as the substrates. Thin film transistors (TFTs) as the active switching elements, a signal wirings, the pixel electrodes 3 and the opposed electrodes 4 were formed on the substrate 2, therefore the substrate 2 is called as a TFT substrate. A color filter (CF: not shown) comprising Red, Green and Blue is provided on the counter substrate 1, therefore the substrate 1 is called as a CF substrate.

The pixel electrode 3 and the opposed electrode 4 are formed by patterning a Cr layer of 100 nm thickness with photolithography method so that a width of each electrode is set to 5 μm and interval between adjacent electrodes is set to 10 μm. However, the width of electrode, the interval between electrode, number of electrode and the like are not restricted to the examples described above. In this embodiment, an intersection of a source signal wiring and a gate signal wiring is stepped out by 1.1 μm from adjacent light transmitting portion in each. Meanwhile, the active switching elements such as TFTs could have any arrangement as long as voltage is applicable to the pixel electrode through them so as to form electric field between pixel electrode and opposed electrode. Since a manufacturing method of TFTs is not related to a main frame of the present invention, detailed description thereof will be omitted.

Alignment films OPTOMER™ AL 1054 (products of JSR Corporation) made of soluble polyimide were formed on a TFT substrate and a CF substrate by a flexo printing method, and was burned for one hour in an oven at a temperature of 180° C. Thus, alignment films having a thickness of 70 nm were obtained. A material of the alignment film which was used is not restricted but any alignment film for aligning a liquid crystal through a rubbing treatment may be used.

Figure 4A:
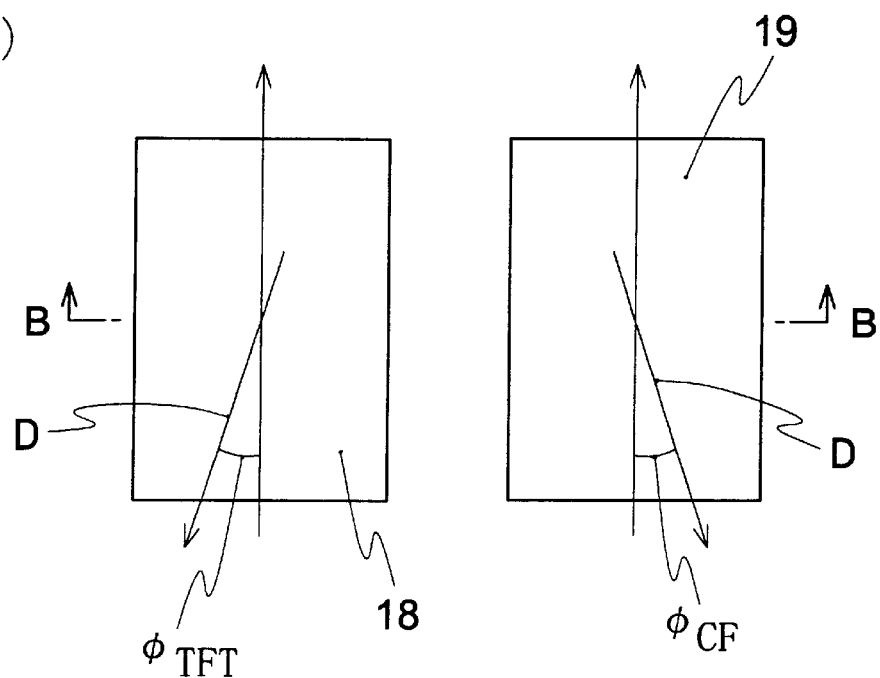
FIGS. 4(a) to 4(c) are explanatory views showing directions of aligning treatment and arrangement of treated substrates.
Figure 4B:
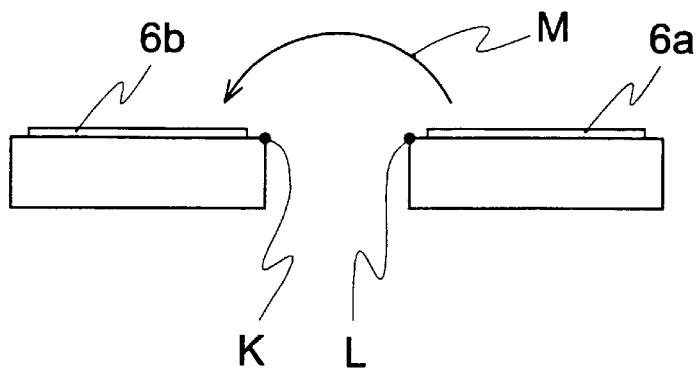
Figure 4C:
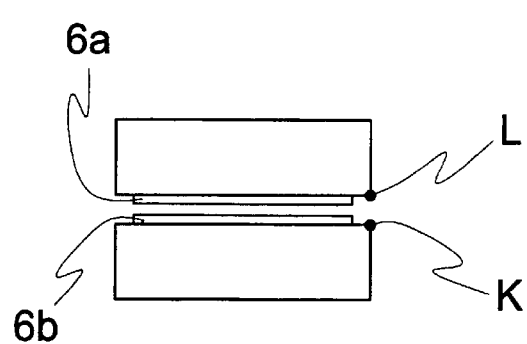

In the present example, the TFT substrate and the CF substrate which are provided with the alignment film was subjected to the rubbing treatment once with an amount of deformation of 0.4 mm, a revolution of roller of 400 rpm and a stage moving speed of 15 mm/s by means of a roller having a diameter of 130 mm, around which a rubbing cloth having a staple length of 1.85 mm wrapped. At this time, the rubbing strength L expressed in the Equation 3 was 73 mm. The direction of the rubbing treatment will be described with reference to FIGS. 4(a) to 4(c). FIG. 4(b) is a view showing a section taken along the line B—B of FIG. 4(a), illustrating superposition of the TFT substrate and the CF substrate. The TFT substrate and the CF substrate which are completely subjected to the rubbing treatment are superposed as shown in an arrow M with corresponding points K and L coincident with each other as shown in FIGS. 4(b) and 4(c). As shown in an arrow D of FIG. 4(a), rubbing directions $\phi_{TFT}$ and $\phi_{CF}$ for the TFT substrate 18 and the CF substrate 19 were set to be parallel with each other, that is, coincident with each other to form an angle of 10 degrees with respect to the length-wise direction of pixel electrode when the TFT substrate 18 is superposed on the CF substrate 19, and were set such that a pretilt direction of the liquid crystal molecule on the interface of the TFT substrate 18 and the liquid crystal layer and that of the liquid crystal molecule on the interface of the CF substrate 19 and the liquid crystal layer are identical (parallel) to each other. The rubbing directions $\phi_{TFT}$ and $\phi_{CF}$ imply directions in which the liquid crystal is rotated when a voltage is applied (clockwise on the basis of the TFT substrate 18 in FIG. 4) in a state in which the TFT substrate 18 and the CF substrate 19 are superposed.

Furthermore, separators comprising polymer beads were distributed onto one of the substrates, a seal material was applied onto the outer periphery of a display region in the other substrate leaving a part and both substrates were stuck. Next, a liquid crystal having a dielectric anisotropy of Δε=7.8 and Δn=0.079 was injected through a vacuum injecting method by using, as an injecting port, a portion where the seal material is not applied, and the injecting port was sealed with an ultraviolet thermosetting type sealing material. At this time, a panel gap (a gap between the TFT substrate 18 and the CF substrate 19) was set to 4.2 μm.

The average aligning direction $\theta_{1c}$ of the liquid crystal layer of the liquid crystal panel is determined by the equation (2) using a polarizing microscope having polarizing plates in a cross nicole arrangement. While disposing the liquid crystal panel onto the polarizing microscope and rotating successively by 0.5 degree, each area Si wherein the light is extinguished is determined in relation to each angle $\theta_i$ by means of imaging with a CCD camera and succeeding image processing. Thereafter, each area Si with each angle $\theta_i$ is put into the equation (2) so as to determine the average aligning direction $\theta_{1c}$ of the liquid crystal layer. The average aligning direction $\theta_{1c}$ of the liquid crystal layer of the liquid crystal panel thus fabricated was an angle of 10 degrees with respect to the longitudinal direction of the pixel electrode. Moreover, the aligning direction of the liquid crystal molecules in each pixel was set to 2.0 degree or less with respect to the average aligning direction $\theta_{1c}$ of the liquid crystal layer. With a driving circuit attached to the liquid crystal panel, a voltage of amplitude 0.3 V is applied between the pixel electrodes 3 and the opposed electrodes 4. The liquid crystal panel thus being driven was interposed between two polarizing plates having absorption axes orthogonal to each other and the polarizing plates were rotated with the relationship between the polarizing plates maintained. Thus, an intensity of a transmitted light was measured. As a result, when the direction $\theta_{p1}$ of the absorption axis of one of the polarizing plates is 0.5 degree, the intensity of the transmitted light was minimized. More specifically, when the voltage amplitude between the pixel electrode 3 and the opposed electrode 4 was 0.3 V, the average aligning direction $\theta_{1c}$ (bk) of the liquid crystal layer was 0.5 degree during black display.

A polarizing plate having an absorption axis of 10 degrees was laminated to the TFT substrate 18 of the liquid crystal panel.

Moreover, one of five polarizing plates having absorption axes of 98 degrees, 99 degrees, 100 degrees, 101 degrees and 102 degrees was provided on the CF substrate 19.

Next, the driving circuit and the backlight were combined with the liquid crystal panel, thereby the liquid crystal display was formed. For the liquid crystal display obtained as described above, a contrast ratio was measured. At this time, an amplitude of a voltage to be applied between the pixel electrode 3 and the opposed electrode 4 was set to 6 V and 0.3 V for white display and black display, respectively. Hereinafter, an angle of view in an up and down direction and an angle of view in a right and left direction are measured and defined as an range of angles of a viewer's sight wherein a contrast ratio of white display to black display being larger than 10:1 is observed. It should be noted that the liquid crystal display is positioned so that the longitudinal direction of the pixel electrode is set to an up and down direction.

The contrast ratio shown in Table 1 indicates a result of measurement at the vertical direction (at the right angle to the frontal face) with respect to the liquid crystal display. When the absorption axis of the polarizing plate laminated to the CF substrate was 100 degrees (i.e. orthogonally to the absorption axis of the polarizing plate on the TFT substrate), a high contrast ratio of 195:1 was obtained. Moreover, when the absorption axis of the polarizing plate on the TFT substrate was parallel with an initial average aligning direction (i.e. average aligning direction without applying voltages) $\theta_{1c}$ of the liquid crystal layer and an angle formed by the absorption axes of the polarizing plates on the TFT and CF substrates was set to 90 degrees ±2 degrees, a high contrast ratio of 100:1 or more was obtained. Moreover, as indicated in the Table 1, angles of view in an up and down direction and in a right and left direction were set to a wide range of 160 degrees or more and an excellent display characteristic could be obtained without mura in a displayed image.

TABLE 1

| | strength of rubbing (mm) | rubbing angle of CF substrate Φ CF (°) | rubbing angle of TFT substrate Φ TFT (°) | absorption axis on the CF substrate (°) | absorption axis on the TFT substrate (°) | $\theta_{1c}$ (°) | δ $\theta_{1c}$ (°) | contrast ratio [-] | angle of view up and down | angle of view right and left | "mura" of display |
|---|---|---|---|---|---|---|---|---|---|---|---|
| EMBODIMENT 1 | 73 | 10 | 10 | 98 | 10 | 10 | ≤2 | 100 | >160 | >160 | No |
| | | | | 99 | | | | 155 | >160 | >160 | No |
| | | | | 100 | | | | 195 | >160 | >160 | No |
| | | | | 101 | | | | 160 | >160 | >160 | No |
| | | | | 102 | | | | 105 | >160 | >160 | No |
| EMBODIMENT 2 | TFT substrate 120 CF substrate 60 | 10 | 10 | 98 | 10 | 10 | ≤1.5 | 108 | >160 | >160 | No |
| | | | | 99 | | | | 158 | >160 | >160 | No |
| | | | | 100 | | | | 205 | >160 | >160 | No |
| | | | | 101 | | | | 170 | >160 | >160 | No |
| | | | | 102 | | | | 112 | >160 | >160 | No |
| EMBODIMENT 3 | 60 | 10 | 10 | 98 | 10 | 10 | ≤2 | 76 | >160 | >160 | No |
| | | | | 99 | | | | 117 | >160 | >160 | No |
| | | | | 100 | | | | 157 | >160 | >160 | No |
| | | | | 101 | | | | 152 | >160 | >160 | No |
| | | | | 102 | | | | 108 | >160 | >160 | No |
| Com. Ex.1 | 40 | 10 | 10 | 98 | 10 | 10 | ≤3.5 | 60 | >160 | >160 | No |
| | | | | 99 | | | | 90 | >160 | >160 | No |
| | | | | 100 | | | | 122 | >160 | >160 | No |
| | | | | 101 | | | | 132 | >160 | >160 | No |
| | | | | 102 | | | | 107 | >160 | >150 | No | voltage for displaying black: 0.3 V, voltage for displaying white: 6 V

As in the present embodiment, a liquid crystal panel having aligning directions of a liquid crystal molecules in each pixel set to 2.0 degrees or less with respect to the average aligning direction $\theta_{1c}$ of the liquid crystal layer was interposed between polarizing plates having their absorption axes almost orthogonal to each other. Consequently, a liquid crystal display having a high contrast ratio and a high display quality could be obtained.

In the present embodiment, the liquid crystal display in which the direction of absorption axis of the polarizing plate on TFT substrate is fixed to be in parallel to the average aligning direction $\theta_{1c}$ and the direction of the absorption axis of the polarizing plate on CF substrate is varied with in a range of ±2 degree with respect to the direction orthogonal to the average aligning direction $\theta_{1c}$ has been described. However, also in a liquid crystal display wherein the direction of absorption axis of the polarizing plate on CF substrate is fixed to be orthogonal to the average aligning direction $\theta_{1c}$ and the direction of the absorption axis of the polarizing plate on TFT substrate is varied with in a range of ±2 degree with respect to the parallel direction to the average aligning direction $\theta_{1c}$, the advantage of this embodiment could be attained. Moreover, even if the direction of the absorption axis of the polarizing plate on the CF substrate is caused to approximate 10 degrees, i.e. parallel to the average aligning direction, and the absorption axis of the polarizing plate on the TFT substrate is provided almost perpendicularly to the absorption axis of the polarizing plate on the CF substrate, the same advantages can also be obtained. These advantages can be similarly obtained in the following embodiment.

Embodiment 2

In the present embodiment, alignment films on the substrates were formed in the same manner as in EMBODIMENT 1. Then, a TFT substrate was subjected to a rubbing treatment twice on the rubbing conditions of an amount of deformation of 0.35 mm, a revolution of a roller of 500 rpm and a stage moving speed of 20 mm/s. At this time, a rubbing strength L was 120 mm. Moreover, the CF substrate was subjected to the rubbing treatment once on the same conditions as those of the TFT substrate. At this time, the rubbing strength L was 60 mm. Other conditions of fabrication are the same as those of EMBODIMEMENT 1.

The average aligning direction $\theta_{1c}$ of the liquid crystal layer of the liquid crystal panel fabricated as described above was almost 10 degrees with respect to the length wise direction of the pixel electrode as shown in Table 2. Moreover, aligning directions of the liquid crystal molecules in each pixel were set to 1.5 degrees or less with respect to the average aligning direction $\theta_{1c}$ of the liquid crystal layer. A polarizing plate having an absorption axis of 10 degrees was provided on the TFT substrate of the liquid crystal panel. Moreover, one of five polarizing plates having absorption axes of 98 degrees, 99 degrees, 100 degrees, 101 degrees and 102 degrees were provided on the CF substrate.

In the same manner as in EMBODIMENT 1, next, the driving circuit and the backlight were combined with the liquid crystal panel, thereby the liquid crystal display was formed. For the liquid crystal display thus obtained, a contrast ratio was measured at a vertical direction (at the right angle to the frontal face of the display). The result is shown in the Table 1. When the absorption axis of the polarizing plate on the TFT substrate was parallel with an initial average aligning direction $\theta_{1c}$ of the liquid crystal layer and an angle formed by the absorption axes of the polarizing plates on the TFT and CF substrates was set to 90 degrees ±2 degrees, a high contrast ratio of 100:1 or more was obtained. Moreover, as indicated in the Table 1, angles of view in an up and down direction and in a right and left direction were set to a wide range of 160 degrees or more and an excellent display characteristic could be obtained without mura in a display screen.

As in the present embodiment, a liquid crystal panel having aligning directions of a liquid crystal molecules in each pixel set to 1.5 degrees or less with respect to the average aligning direction $\theta_{1c}$ of the liquid crystal layer was interposed between polarizing plates having their absorption axes almost orthogonal to each other. Consequently, a liquid crystal display having a high contrast ratio and a high display quality could be obtained.

Embodiment 3

In the present embodiment, alignment films on the substrates were formed in the same manner as in EMBDIMENT 1. Then, a TFT substrate and a CF substrate were subjected to a rubbing treatment once on the rubbing conditions of an amount of deformation of 0.35 mm, a revolution of roller of 1000 rpm and a stage moving speed of 40 mm/s. At this time, a rubbing strength L was 60 mm. Other conditions of fabrication are the same as those of EMBODIMENT 1.

The average aligning direction $\theta_{1c}$ of the liquid crystal layer of the liquid crystal panel fabricated as described above was almost 10 degrees with respect to the length wise direction of the pixel electrode as shown in Table 1. Moreover, aligning directions of the liquid crystal molecules in each pixel were set to 2 degrees or less with respect to the average aligning direction $\theta_{1c}$ of the liquid crystal layer. A polarizing plate having an absorption axis of 10 degrees was provided on the TFT substrate of the liquid crystal panel. Moreover, one of five polarizing plates having absorption axes of 98 degrees, 99 degrees, 100 degrees, 101 degrees and 102 degrees were provided on the CF substrate.

In the same manner as in EMBODIMENT 1, next, the driving circuit and the backlight were combined with the liquid crystal panel, thereby the liquid crystal display was formed. For the liquid crystal display thus obtained, a contrast ratio was measured at a vertical direction (at the right angle to the frontal face of the display). The result is shown in Table 1. When the absorption axis of the polarizing plate on the TFT substrate was parallel with an initial average aligning direction $\theta_{1c}$ of the liquid crystal layer and an angle formed by the absorption axes of the polarizing plates on the TFT and CF substrates were set to 89 degrees to 92 degrees, a high contrast ratio of 100:1 or more was obtained. Moreover, as indicated in the Table 1, angles of view in an up and down direction and in a right and left direction were set to a wide range of 160 degrees or more and an excellent display characteristic could be obtained without mura in a displayed image.

As in the present embodiment, a liquid crystal panel having aligning directions of a liquid crystal molecules in each pixel set to 2 degrees or less with respect to the average aligning direction $\theta_{1c}$ of the liquid crystal layer was interposed between polarizing plates having their absorption axes almost orthogonal to each other. Consequently, a liquid crystal display having a high contrast ratio and a high display quality could be obtained.

COMPARATIVE EXAMPLE 1

In the present comparative example, alignment films on the substrates were formed in the same manner as in EMBODIMENT 1. Then, both substrates were subjected to a rubbing processing once on the rubbing conditions of an amount of deformation of 0.35 mm, a roller rotating speed of 250 rpm and a stage moving speed of 15 mm/s. At this time, a rubbing strength L was 40 mm. Other conditions of fabrication are the same as those of EMBODIMENT 1.

The average aligning direction $\theta_{1c}$ of the liquid crystal layer of the liquid crystal panel fabricated as described above was almost 10 degrees with respect to the longitudinal direction of the pixel electrode as shown in Table 1. Moreover, aligning directions of the liquid crystal molecules in each pixel were set to 3.5 degrees or less with respect to the average aligning direction $\theta_{1c}$ of the liquid crystal layer. A polarizing plate having an absorption axis of 10 degrees was provided on the TFT substrate of the liquid crystal panel. Moreover, one of five polarizing plates having absorption axes of 98 degrees, 99 degrees, 100 degrees, 101 degrees and 102 degrees were provided on the CF substrate.

In the same manner as in EMBODIMENT 1, next, the driving circuit and the backlight were combined with the liquid crystal panel, thereby the liquid crystal display was formed. For the liquid crystal display thus obtained, a contrast ratio was measured at a vertical direction (at the light angle to the frontal face of the display). The result is shown in Table 1. In the present comparative example, a contrast ratio of 100:1 is attained only when the angle formed by the absorption axes of the two polarizing plates was 90 degrees to 92 degrees, and the contrast ratio itself also has a smaller value than that in each of EMBODIMENT 1 to EMBODIMENT 3. In the case in which the angle formed by the absorption axes of the two polarizing plates was 92 degrees, an angle of view in a right and left direction was 150 degrees, which is smaller than that in each of EMBODIMENT 1 to EMBODIMENT 3.

Embodiment 4

In the present example, alignment films on the substrates were formed in the same manner as in EMBODIMENT 1. Then, both substrates were subjected to a rubbing treatment once on the rubbing conditions of an amount of deformation of 0.40 mm, a revolution of roller of 500 rpm and a stage moving speed of 20 mm/s. At this time, a rubbing strength L was 68 mm.

Figure 5A:
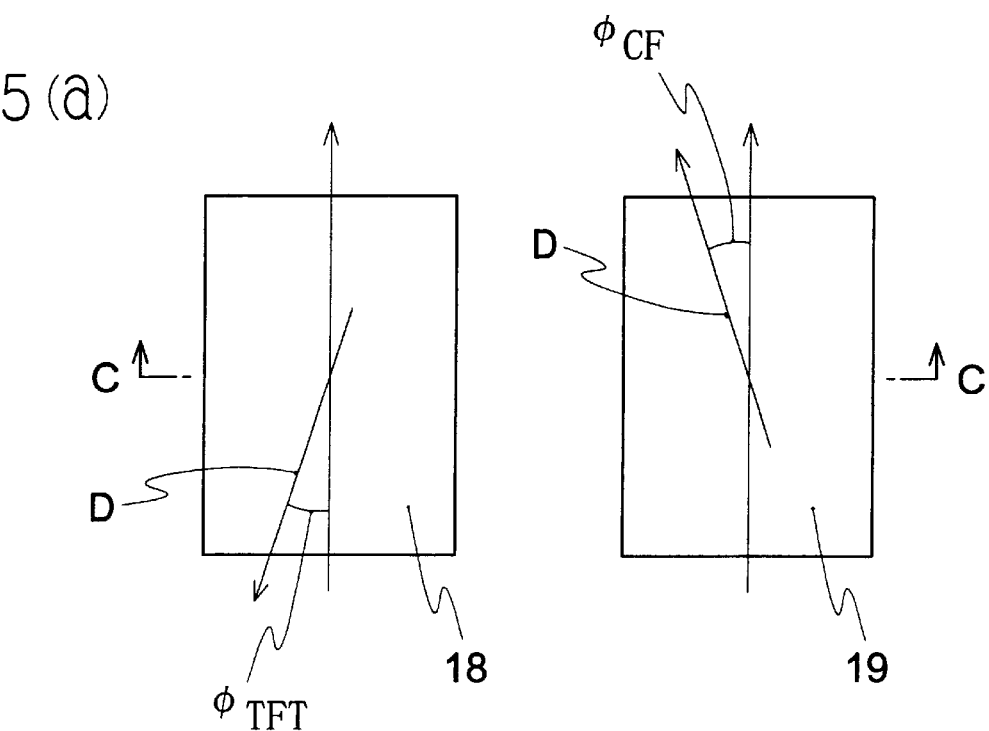
FIGS. 5(a) to 5(c) are explanatory views showing directions of aligning treatment and arrangement of treated substrates.
Figure 5B:
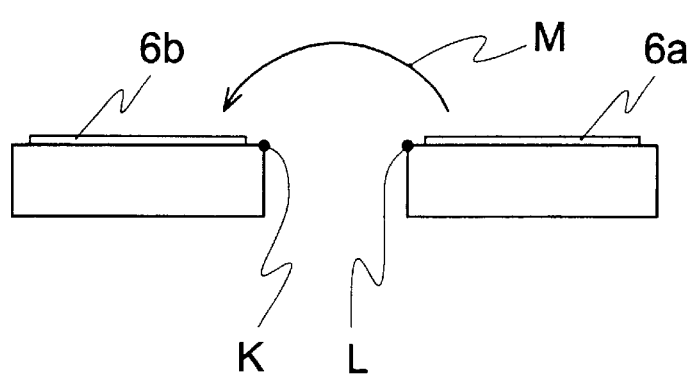
Figure 5C:
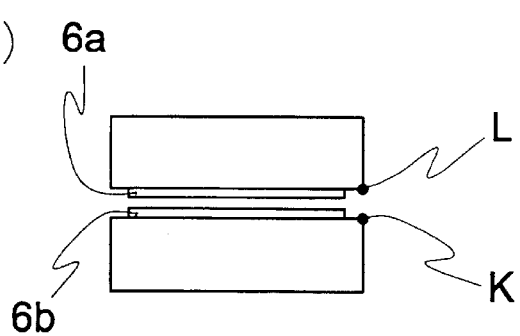
Figure 6:
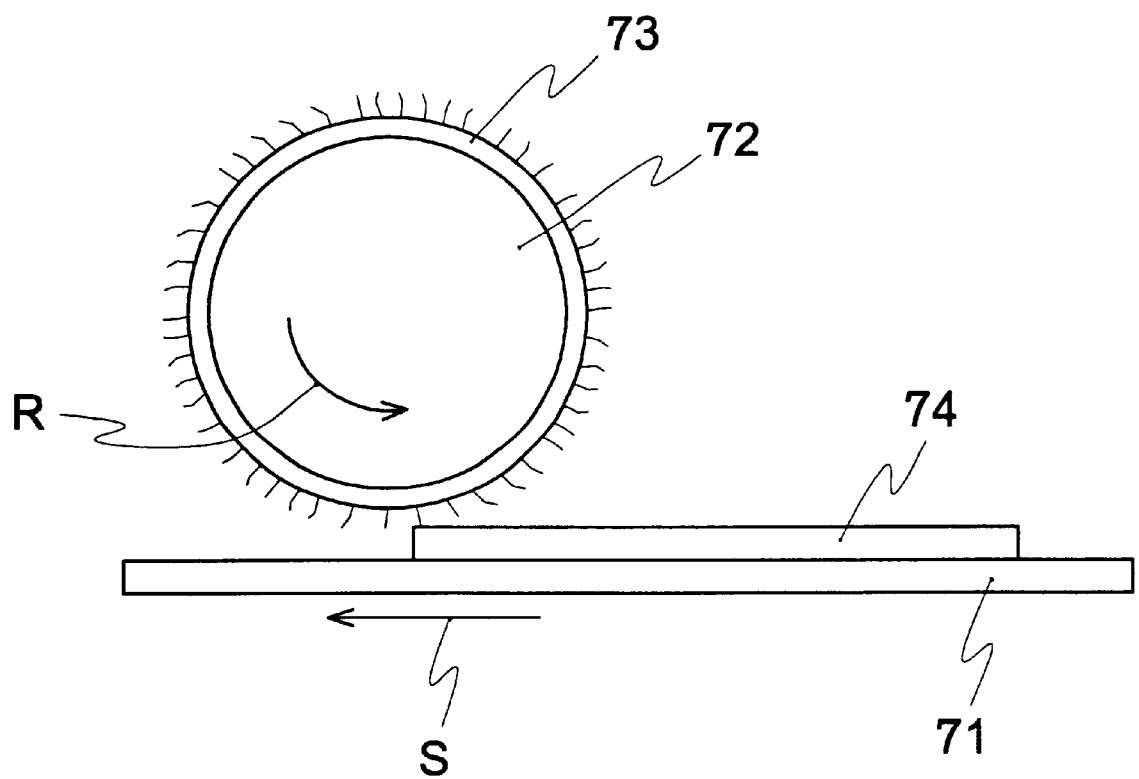
FIG. 6 is an explanatory view showing a rubbing treatment.
Figure 7C:
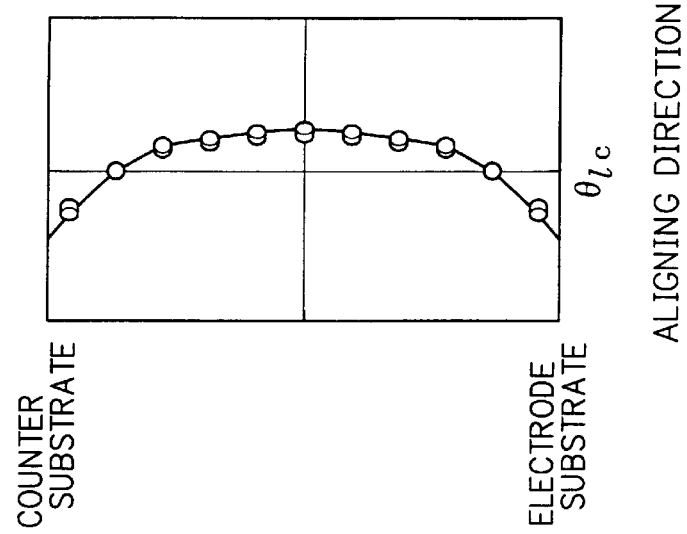
FIG. 7(a) to 7(c) are explanatory views showing an alignment of liquid crystal molecules.
Figure 7B:
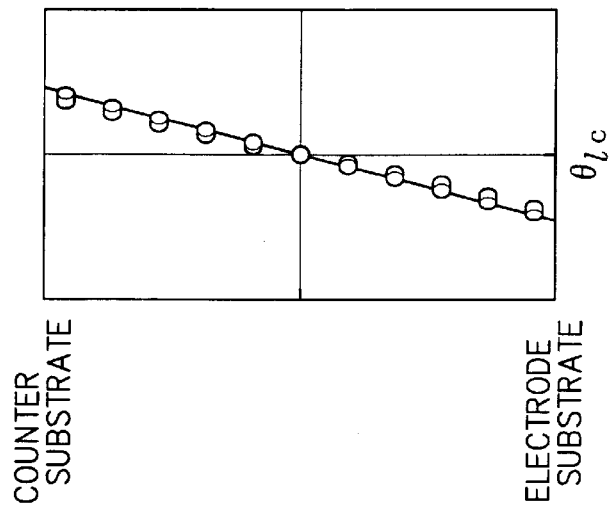
Figure 7A:
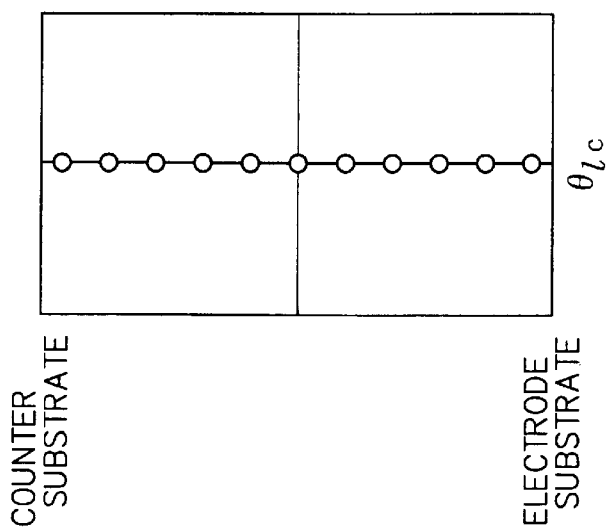
Figure 8:
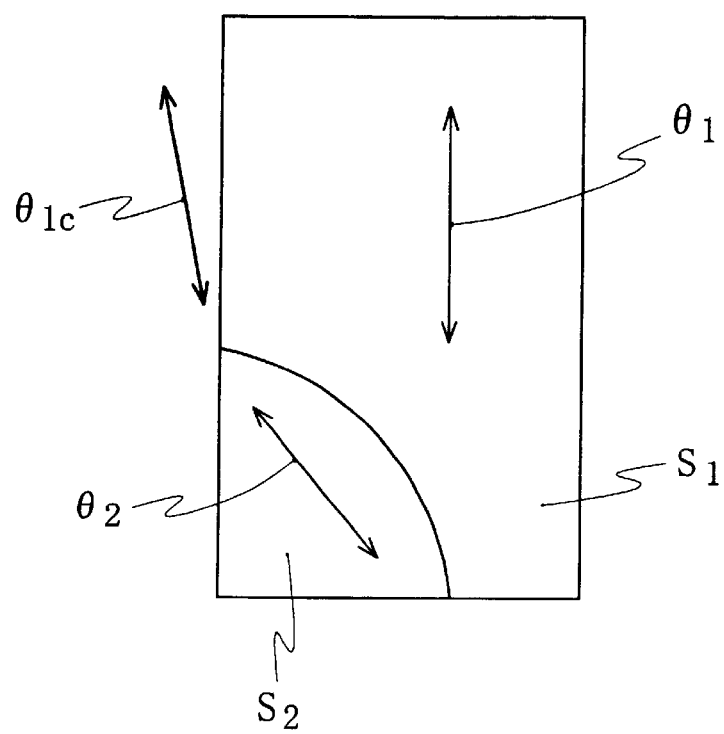
FIG. 8 is a schematic illustration showing a definition of an average aligning direction $\theta_{1c}$ of a liquid crystal layer.
Figure 9:
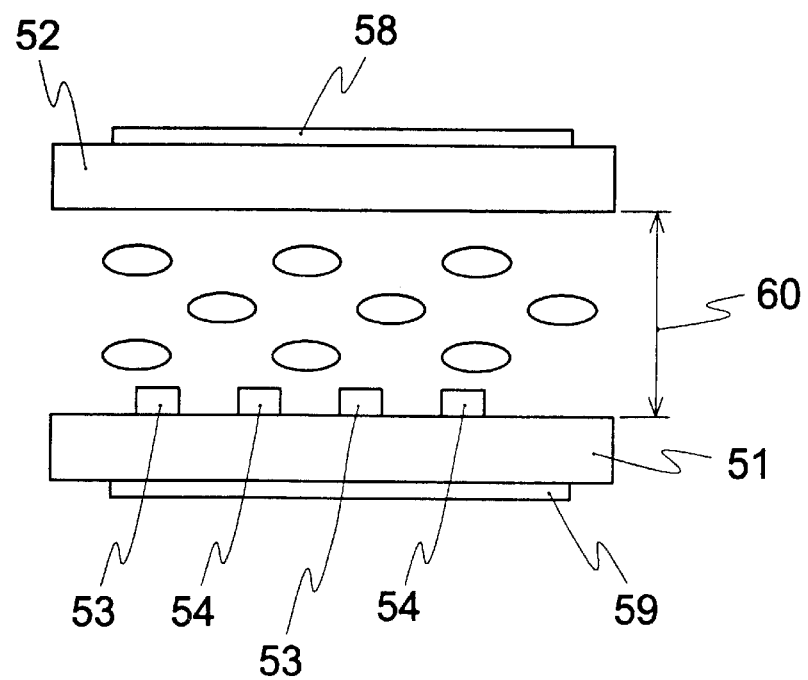
FIG. 9 is an explanatory view showing a conventional IPS mode liquid crystal display.
Figure 11:
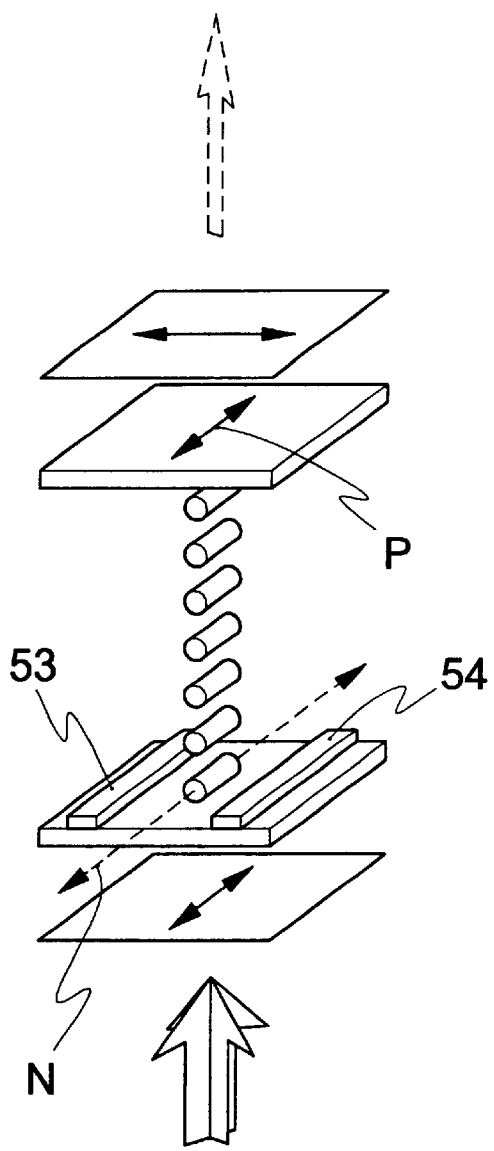
FIGS. 11(a) to 11(b) are an explanatory view showing a principle of displaying images in the IPS mode liquid crystal display.
Figure 11:
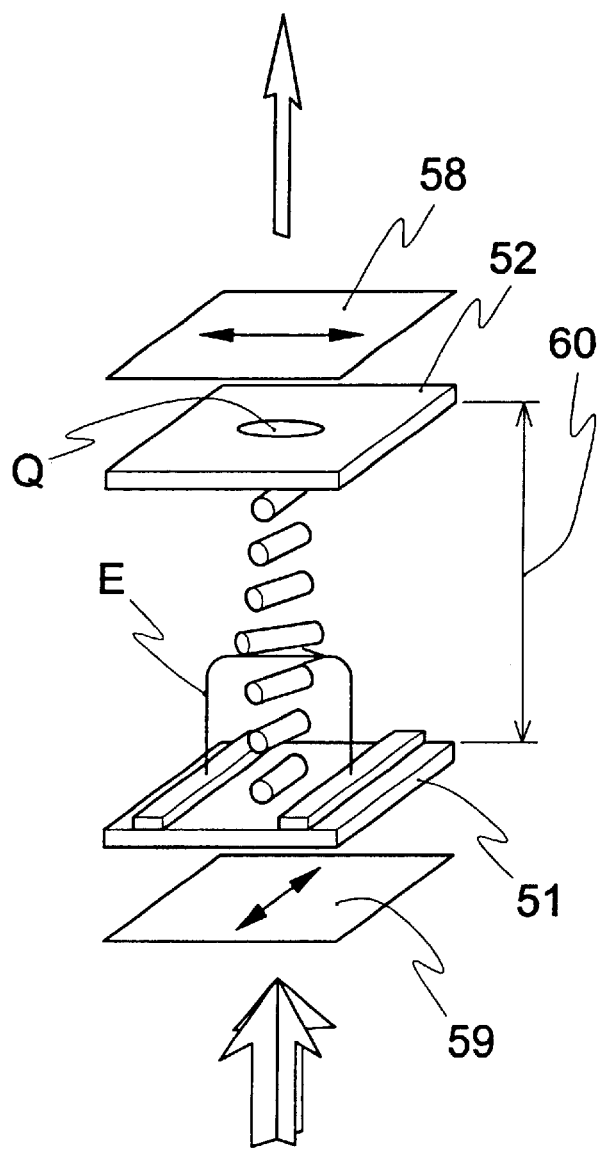
Figure 12:
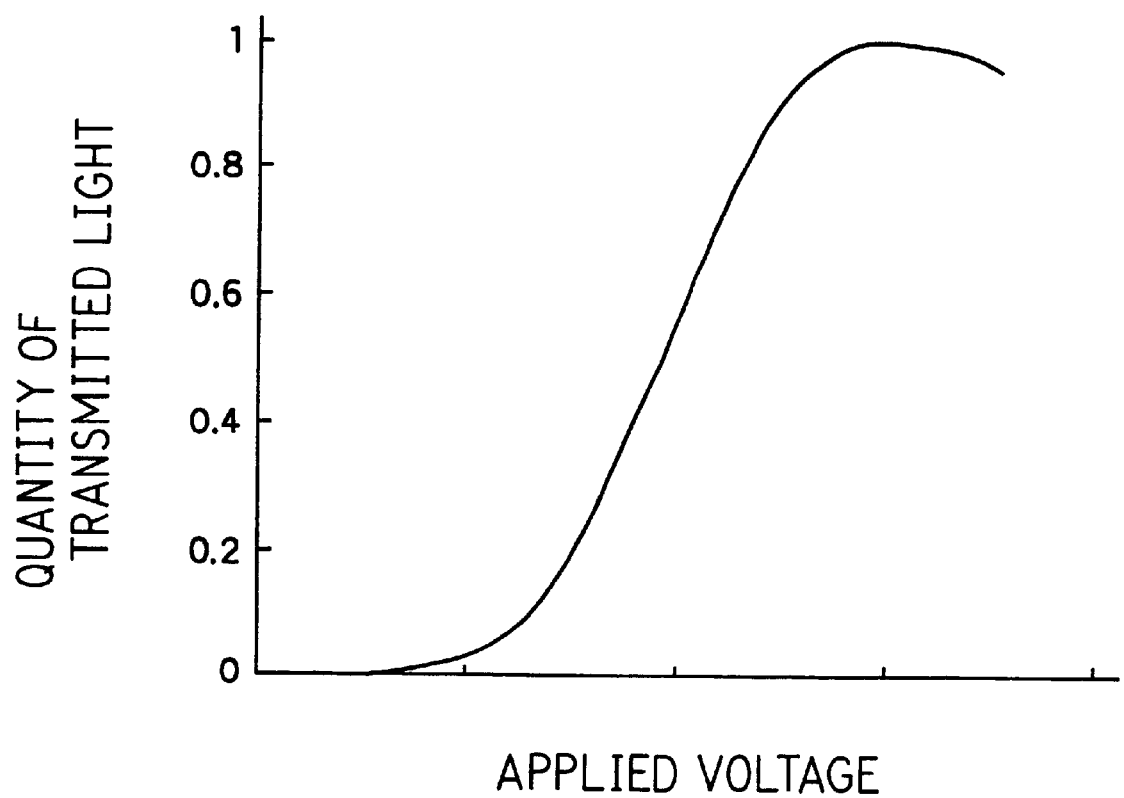
FIG. 12 is an explanatory view showing a relationship between the applied voltage and the intensity of transmitted light.

With reference to FIGS. 5(a) to 5(c), a direction of the rubbing treatment will be described. FIG. 5(b) is a view showing a section taken along the line C—C in FIG. 5(a), illustrating superposition of the TFT substrate and the CF substrate. As illustrated in FIGS. 5(b) and 5(c), the TFT substrate and the CF substrate which are completely subjected to the rubbing processing are superposed as shown in an arrow M such that corresponding points K and L are coincident with each other. A rubbing direction of a rubbing processing D was set to 15 degrees with respect to the length-wise direction of the pixel electrode for the TFT substrate $\phi_{TFT}$ and the CF substrate $\phi_{CF}$, and orientation of a liquid crystal which is obtained by the superposition of the substrates was set to be antiparallel as shown in FIGS. 5(a) to 5(c). That is, an aligning direction of liquid crystal molecule adjacent to the electrode substrate and that of adjacent to the counter substrate are identical, and a pletilt direction of liquid crystal molecule adjacent to the electrode substrate and that of adjacent to the counter substrate are varied. Other conditions of fabrication are the same as those of EMBODIMENT 1.

The average aligning direction $\theta_{1c}$ of the liquid crystal layer of the liquid crystal panel fabricated as described above was almost 15 degrees with respect to the length wise direction of the pixel electrode as shown in Table 2. Moreover, aligning directions of the liquid crystal molecules in each pixel were set to 2 degrees or less with respect to the average aligning direction $\theta_{1c}$ of the liquid crystal layer. A polarizing plate having an absorption axis of 15 degrees was provided on the TFT substrate of the liquid crystal panel. Moreover, one of five polarizing plates having absorption axes of 103 degrees, 104 degrees, 105 degrees, 106 degrees and 107 degrees provided on to the CF substrate.

In the same manner as in EMBODIMENT 1, next, the driving circuit and the backlight were combined with the liquid crystal panel, thereby constituting the liquid crystal display. For the liquid crystal display thus obtained, a white display voltage was set to 6.5 V and a black display voltage was set to 0.3V. Thus, a contrast ratio was measured. The result is shown in Table 2. When the absorption axis of the polarizing plate on the TFT substrate was parallel with an initial average aligning direction $\theta_{1c}$ of the liquid crystal layer and an angle formed by the absorption axes of the polarizing plates on the TFT and CF substrates were set to 88 degrees to 92 degrees, a high contrast ratio of 100:1 or more was obtained. Moreover, as indicated in Table 2, angles of view in an up and down direction and in a right and left direction were set to a wide range of 160 degrees or more and an excellent display characteristic could be obtained without mura in a display screen.

TABLE 2

| | | | | polarizing plate | | | | | angle of view | | |
| | | rubbing angle of | rubbing angle of | absorption axis on the | absorption axis on the | | | | | | |
| | strength of rubbing (mm) | CF substrate Φ CF (°) | TFT substrate Φ TFT (°) | CF substrate (°) | TFT substrate (°) | $\theta_{1c}$ (°) | $\delta\theta_{1c}$ (°) | contrast ratio [-] | up and down | right and left | "mura" of display |
|---|---|---|---|---|---|---|---|---|---|---|---|
| EMBODI-MENT 4 | 68 | 15 | 15 | 103 | 15 | 15 | ≦2 | 101 | >160 | >160 | No |
| | | | | 104 | | | | 156 | >160 | >160 | No |
| | | | | 105 | | | | 190 | >160 | >160 | No |
| | | | | 106 | | | | 165 | >160 | >160 | No |
| | | | | 107 | | | | 105 | >160 | >160 | No |
| EMBODI-MENT 5 | 119 | 14 | 16 | 103 | 15 | 15 | ≦2 | 100 | >160 | >160 | No |
| | | | | 104 | | | | 152 | >160 | >160 | No |
| | | | | 105 | | | | 189 | >160 | >160 | No |
| | | | | 106 | | | | 160 | >160 | >160 | No |
| | | | | 107 | | | | 103 | >160 | >160 | No |
| EMBODI-MENT 6 | 286 | 15 | 15 | 103 | 15 | 15 | ≦2 | 101 | >160 | >160 | No |
| | | | | 104 | | | | 157 | >160 | >160 | No |
| | | | | 105 | | | | 200 | >160 | >160 | No |
| | | | | 106 | | | | 165 | >160 | >160 | No |
| | | | | 107 | | | | 110 | >160 | >160 | No |
| Com. Ex.2 | 327 | 15 | 15 | 103 | 15 | 15 | ≦1.5 | 103 | >160 | >160 | Yes |
| | | | | 104 | | | | 160 | >160 | >160 | Yes |
| | | | | 105 | | | | 203 | >160 | >160 | Yes |
| | | | | 106 | | | | 166 | >160 | >160 | Yes |
| | | | | 107 | | | | 111 | >160 | >160 | Yes | voltage for displaying black: 0.3 V, voltage for displaying white: 6.5 V

As in the present embodiment, a liquid crystal panel having aligning directions of liquid crystal molecules in each pixel set to 2 degrees or less with respect to the average aligning direction $\theta_{1c}$ of the liquid crystal layer was interposed between polarizing plates having their absorption axes almost orthogonal to each other. Consequently, a liquid crystal display having a high contrast ratio and a high display quality could be obtained.

Embodiment 5

In the present embodiment, alignment films on the substrates were formed in the same manner as in EMBODIMENT 1. Then, both substrates were subjected to a rubbing treatment once on the rubbing conditions of an amount of deformation of 0.35 mm, a revolution of a roller 1000 rpm and a stage moving speed of 20 mm/s. At this time, a rubbing strength L was 119 mm.

Referring to directions of rubbing treatments, a direction of the treatment in TFT substrate $\phi$TFTwas set to 16 degrees and a direction of the treatment in CF substrate $\phi_{CF}$ was set to 14 degrees, and an orientation of a liquid crystal which is obtained by the superposition of the treated substrates was set to be antiparallel as shown in FIG. 5. Other conditions of fabrication are the same as those of EMBODIMENT 1.

The average aligning direction $\theta_{1c}$ of the liquid crystal layer of the liquid crystal panel fabricated as described above was almost 15 degrees with respect to the longitudinal direction of the pixel electrode as shown in the Table 2. Moreover, the aligning directions of the liquid crystal molecules in each pixel were set to 2 degrees or less with respect to the average aligning direction $\theta_{1c}$ of the liquid crystal layer. A polarizing plate having an absorption axis of 15 degrees was provided on the TFT substrate of the liquid crystal panel. Moreover, one of five polarizing plates having absorption axes of 103 degrees, 104 degrees, 105 degrees, 106 degrees and 107 degrees were provided on the CF substrate.

In the same manner as in EMBODIMENT 1, next, the driving circuit and the backlight were combined with the liquid crystal panel, thereby the liquid crystal display was formed. For the liquid crystal display thus obtained, a contrast ratio was measured at a vertical direction (at the right angle to the frontal face of the display). As shown in Table 2, consequently, the contrast ratio was high, that is, 100:1 or more without depending on an angle of an absorption axis of the polarizing plate provided on the CF substrate. Moreover, as indicated in Table 2, angles of view in an up and down direction and in a right and left direction were set to a wide range of 160 degrees or more and an excellent display characteristic could be obtained without mura in a displayed image.

As in the present embodiment, a liquid crystal panel in which directions of aligning treatments of the TFT substrate and the CF substrate are almost parallel with each other and having aligning directions of liquid crystal molecules in each pixel set to 2 degrees or less with respect to the average aligning direction $\theta_{1c}$ of the liquid crystal layer was interposed between polarizing plates having their absorption axes almost orthogonal to each other. Consequently, a liquid crystal display having a high contrast ratio and a high display quality could be obtained.

Embodiment 6

In the present embodiment, alignment films on the substrates were formed in the same manner as in EMBODIMENT 1. Both substrates were subjected to a rubbing treatment once on the rubbing conditions of an amount of deformation of 0.35 mm, a revolution of a roller of 1200 rpm and a stage moving speed of 10 mm/s. At this time, a rubbing strength L was 286 mm.

Referring to directions of rubbing treatments, both a TFT substrate $\phi_{TFT}$ and a CF substrate $\phi_{CF}$ were set to 15 degrees, and orientations of a liquid crystal which are obtained by the superposition of treated substrates were set to be antiparallel as shown in FIG. 5. Other conditions of fabrication are the same as those of EMBODIMENT 1.

The average aligning direction $\theta_{1c}$ of the liquid crystal layer of the liquid crystal panel fabricated as described above was almost 15 degrees with respect to the length wise direction of the pixel electrode as shown in Table 2. Moreover, the aligning direction of the liquid crystal molecules in each pixel were set to 2 degrees or less with respect to the average aligning direction $\theta_{1c}$ of the liquid crystal layer. A polarizing plate having an absorption axis of 15 degrees was provided on the TFT substrate of the liquid crystal panel. Moreover, one of five polarizing plates having absorption axes of 103 degrees, 104 degrees, 105 degrees, 106 degrees and 107 degrees were provided on the CF substrate.

In the same manner as in EMBODIMENT 1, next, the driving circuit and the backlight were combined with the liquid crystal panel, thereby the liquid crystal display was formed. For the liquid crystal display thus obtained, a contrast ratio was measured at a vertical direction (at the right angle to the frontal face of the display). The result is shown in Table 2. The contrast ratio had a high value, that is, 100:1 or more without depending on an angle of an absorption axis of the polarizing plate provided on the CF substrate. Moreover, as indicated in Table 2, angles of view in an up and down direction and in a right and left direction were set to a wide range of 160 degrees or more and an excellent display characteristic could be obtained without mura in a display screen.

As in the present embodiment, a liquid crystal panel having aligning direction of liquid crystal molecules in each pixel set to 2 degrees or less with respect to the average aligning direction $\theta_{1c}$ of the liquid crystal layer was interposed between polarizing plates having their absorption axes almost orthogonal to each other. Consequently, a liquid crystal display having a high contrast ratio and a high display quality could be obtained.

COMPARATIVE EXAMPLE 2

In the comparative example, alignment films on the substrates were formed in the same manner as in embodiment 1. Both substrates were subjected to a rubbing treatment once on the rubbing conditions of an amount of deformation of 0.40 mm, a revolution of a roller of 1200 rpm and a stage moving speed of 10 mm/s. At this time, a rubbing strength L was 327 mm.

Other conditions of fabrication are the same as those of EMBODIMENT 6. The average aligning direction $\theta_{1c}$ of the liquid crystal layer of the liquid crystal panel fabricated as described above was almost 15 degrees with respect to the longitudinal direction of the pixel electrode as shown in Table 2. Moreover, the aligning directions of the liquid crystal molecules in each pixel were set to 1.5 degrees or less with respect to the average aligning direction $\theta_{1c}$ of the liquid crystal layer. A polarizing plate having an absorption axis of 15 degrees was laminated to the TFT substrate of the liquid crystal panel. Moreover, one of five polarizing plates having absorption axes of 103 degrees, 104 degrees, 105 degrees, 106 degrees and 107 degrees were laminated to the CF substrate.

In the same manner as in EMBODIMENT 6, next, the driving circuit and the backlight were combined with the liquid crystal panel, thereby the liquid crystal display was formed. For the liquid crystal display thus obtained, a contrast ratio was measured at a vertical direction (at the right angle to the frontal face of the display). As shown in Table 2, consequently, the contrast ratio could have a high value that is, 100:1 or more without depending on an angle of an absorption axis of the polarizing plate provided on the CF substrate. Moreover, as indicated in Table 2, angles of view in an up and down direction and in a right and left direction were set to a wide range of 160 degrees or more and an excellent display characteristic could be obtained. However, stripe-shaped mura parallel with the direction of the rubbing treatment was observed in a displayed image so that an excellent display characteristic could not be obtained.

As in the comparative example, when the rubbing strength L was set to 300 mm or more, mura on the screen became remarkable. Consequently, the liquid crystal display had a display quality deteriorated.

Embodiment 7

In the present embodiment, a liquid crystal panel was fabricated on the same conditions as those of EMBODIMENT 5. With a driving circuit attached to the liquid crystal panel, a voltage of amplitude 1.0 V is applied between the pixel electrodes 3 and the opposed electrodes 4, and an average aligning direction $\theta_{1c}$ (bk) of a liquid crystal layer was measured during black display in the same manner as in EMBODIMENT 1. As a result, when the direction $\theta_{1c}$ of the absorption axis of one of the polarizing plates is set to 17.5 degree, the intensity of the transmitted light was minimized. More specifically, when the voltage amplitude between the pixel electrode and the opposed electrode was 1 V, the average aligning direction $\theta_{1c}$ (bk) of the liquid crystal layer was 17.5 degrees during black display.

Next, polarizing plates having combinations of the directions $\theta_{p1}$ and $\theta_{p2}$ of the absorption axes of 16 degrees and 106 degrees, 17 degrees and 107 degrees, 18 degrees and 108 degrees, and 19 degrees and 109 degrees were laminated to a liquid crystal panel fabricated on the same conditions. Then, the driving circuit and a backlight were combined with the liquid crystal panel, thereby a liquid crystal display was formed in the same manner as in EMBODIMENT 1.

For the liquid crystal display obtained as described above, a contrast ratio was measured. At this time, an amplitude of a voltage to be applied between the pixel electrode 3 and the opposed electrode 4 was set to 6.5 V and 1 V for white display and black display, respectively. An angle of view in an up and down direction and an angle of view in a right and left direction are measured and defined as an range of angles of a viewer's sight wherein a contrast ratio of white display to black display being larger than 10:1 is observed. It should be noted that the liquid crystal display is positioned so that the longitudinal direction of the pixel electrode is set to an up and down direction.

As shown in Table 3, consequently, a high contrast ratio of 100:1 or more was obtained for all combination of the polarizing plates. Moreover, as indicated in Table 3, angles of view in an up and down direction and in a right and left direction were set to a wide range of 160 degrees or more and an excellent display characteristic could be obtained without mura in a displayed image.

TABLE 3

| | | | | polarizing plate | | | | | | | | |
| | | rubbing angle of | rubbing angle of | absorption axis on the | absorption axis on the | | | | | angle of view | | |
| | strength of rubbing (mm) | CF substrate Φ CF (°) | TFT substrate Φ TFT (°) | CF substrate (°) | TFT substrate (°) | $\theta_{1c}$ (°) | $\delta\theta_{1c}$ (°) | $\delta\theta_{1c}$ (bk) (°) | contrast ratio [-] | up and down | right and left | "mura" of display |
|---|---|---|---|---|---|---|---|---|---|---|---|---|
| EMBODIMENT 7 | 119 | 15 | 15 | 106 | 16 | 15 | ≦2 | 17.5 | 119 | >160 | >160 | No |
| | | | | 107 | 17 | | | | 197 | >160 | >160 | No |
| | | | | 108 | 18 | | | | 239 | >160 | >160 | No |
| | | | | 109 | 19 | | | | 167 | >160 | >160 | No |
| Com. Ex.3 | 119 | 15 | 15 | 105 | 15 | 15 | ≦2 | 17.5 | 70 | >160 | >160 | No |
| | | | | 110 | 20 | | | | 97 | >160 | >160 | No | voltage for displaying black: 1.0 V, voltage for displaying white: 6.5 V

As in the present embodiment, a liquid crystal panel having aligning directions of liquid crystal molecules in each pixel set to 2 degrees or less with respect to the average aligning direction $\theta_{1c}$ of the liquid crystal layer was interposed between polarizing plates having their absorption axes almost orthogonal to each other such that the absorption axis of one of the polarizing plates is almost parallel with the average aligning direction $\theta_{1c}$ (bk) of the liquid crystal layer during the black display. Consequently, a liquid crystal display having a high contrast ratio, a sharp voltage—transmitted light intensity characteristic and a high display quality could be obtained.

COMPARATIVE EXAMPLE 3

The conditions of fabrication of a liquid crystal panel to be used for the present comparative example is the same as that in the seventh embodiment. Polarizing plates having combinations of the directions $\theta_{p1}$ and $\theta_{p2}$ of the absorption axes of 15 degrees and 105 degrees, and 20 degrees and 110 degrees were laminated to the liquid crystal panel thus fabricated. Then, the driving circuit and a backlight were combined with the liquid crystal panel, thereby a liquid crystal display was formed in the same manner as in EMBODIMENT 7. For the liquid crystal display thus obtained, a contrast ratio was measured at a vertical direction (at the right angle to the frontal face of the display).

As shown in Table 3, consequently, the contrast ratio has a small value of 100:1 or less without depending on the angles of the absorption axes of the polarizing plates. On the other hand, large angles of view, that is, viewing angle of 160 degrees or more was obtained in an up and down direction and in a right and left direction.

As in the present comparative example, when a liquid crystal panel having aligning directions of liquid crystal molecules in each pixel set to 2 degrees or less with respect to the average aligning direction $\theta_{1c}$ of the liquid crystal layer was interposed between polarizing plates having their absorption axes almost orthogonal to each other in such a state that the directions of the absorption axes of the polarizing plates are shifted, by more than 2 degrees, from the average aligning direction $\theta_{1c}$ (bk) of the liquid crystal layer during the black display, a contrast ratio of the liquid crystal display was decreased.

The forgoing is considered as illustrative only of the principle of the invention. Further, because numerous modifications and changes will readily occur to those skilled in the art, it is not desired to limit the invention to the exact construction and operation shown and described, and accordingly all suitable modifications and equivalents may be resorted to falling within the scope of the invention as defined by the claims which follow.

What is claimed is:

1. A liquid crystal display comprising:
   a pair of substrates, at least one of which is transparent;
   a liquid crystal layer interposed between said pair of substrates;
   electrodes configured to apply an electric field to liquid crystal molecules in said liquid crystal layer;
   active switching elements connected with said electrodes;
   an alignment film formed on a surface of at least one of said pair of substrates, said surface contacting said liquid crystal layer; and
   an optical device configured to control a transmission of light in cooperation with alignment of said liquid crystal molecules in each pixel, said optical device being located on at least one said pair of substrates;
   wherein said alignment film is subjected to a rubbing treatment with a rubbing strength so that an aligning direction in a plane parallel to the substrate of each liquid crystal molecule in each pixel is ranged between −2 degrees to +2 degrees with respect to an average aligning direction of said liquid crystal layer.

2. The liquid crystal display of claim 1, wherein said alignment film which is formed on at least one of said pair of substrates is made of organic substance and subjected to an alignment treatment by means of a rubbing treatment.

3. The liquid crystal display of claim 2, wherein a rubbing strength L of said rubbing treatment is represented as follows:

$$L = N \times l_d(1 + 2\pi r n/(60V)),$$

wherein N represents a number of times of rubbing, $l_d$ represents an amount of deformation of rubbing cloth mm, r represents a radius of a roller in mm, n represents a number of revolutions of the roller in rpm and V represents a stage moving speed in mm/s, and said rubbing strength is at least 50 mm.

4. The liquid crystal display of claim 1, wherein said aligning direction of said each liquid crystal molecule in an interface between one of said pair of substrates and said liquid crystal layer is substantially identical to said aligning direction of said each liquid crystal molecule in an interface between the other one of said pair of substrates and said liquid crystal layer.

5. The liquid crystal display of claim 1, wherein said optical device is a pair of polarizing plates, each of said pair of polarizing plates being arranged outside each of said pair of substrates, an absorption axis of one of said pair of polarizing plates is substantially perpendicular to another absorption axis of the other one of said pair of polarizing plates.

6. The liquid crystal display of claim 5, wherein a direction $\theta_{p1}$ of said absorption axis of a polarizing plate of said pair of polarizing plates which is closer to an observer and an average aligning direction $\theta_{1c}$ of said liquid crystal have a relation of $|\theta_{1c}|-2°23 \leq |\theta_{p1}| \leq |\theta_{1c}|+3°$, or a direction $\theta_{p2}$ of said absorption axis of the other polarizing plate which is more distant from said observer and the average aligning direction $\theta_{1c}$ of said liquid crystal have a relation of $|\theta_{1c}|-2° \leq |\theta_{p2}| \leq |\theta_{1c}|+3°$.

7. The liquid crystal display of claim 6, wherein said direction $\theta_{p1}$, of said absorption axis of a polarizing plate of said pair of polarizing plates which is closer to an observer or said direction $\theta_{p2}$ of said absorption axis of the other polarizing plate which is more distant from said observer is substantially equal to said average aligning direction in said liquid crystal layer during black display.

8. A liquid crystal display comprising:
   a pair of substrates, at least one of which is transparent;
   a liquid crystal layer interposed between said pair of substrates;
   electrodes configured to apply an electric field to liquid crystal molecules in said liquid crystal layer, said electrodes being formed on said pair of substrates and arranged along a longitudinal direction;
   active switching elements connected with said electrodes;
   an alignment film formed on a surface of at least one of said pair of substrates, said surface contacting said liquid crystal layer; and
   an optical device configured to control a transmission of light in cooperation with alignment of said liquid crystal molecules in each pixel, said optical device being located on at least one said pair of substrates,
   wherein an aligning direction in a plane parallel to the substrate of each liquid crystal molecule in each pixel is ranged between −2 degrees to +2 degrees with respect to an average aligning direction $\theta_{1c}$ of said liquid crystal layer,
   an angle between a rubbing direction of said alignment film and said longitudinal direction of said electrodes is between 0° C. and 40° C.,
   said alignment film which is formed on at least one of said pair of substrates is made of organic substance and subjected to an alignment treatment by way of a rubbing treatment, and
   a rubbing strength L of said rubbing treatment is represented as follows:

$$L = N \times l_d(1 + 3\pi r n/(60V)),$$

wherein N represents a number of times of rubbing, $l_d$ represents an amount of deformation of rubbing cloth in mm, r represents a radius of a roller in mm, n represents a number of revolutions of the roller in rpm and V represents a stage moving speed in mm/s, and said strength is at least 50 mm.

* * * * *